United States Patent
Hajri et al.

(10) Patent No.: US 12,388,506 B2
(45) Date of Patent: Aug. 12, 2025

(54) APPARATUSES AND METHODS FOR CHANNEL STATE INFORMATION QUANTITIES MODEL REPORTING

(71) Applicant: Nokia Technologies Oy, Espoo (FI)

(72) Inventors: Salah Eddine Hajri, Nozay (FR); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 18/247,170

(22) PCT Filed: Oct. 15, 2020

(86) PCT No.: PCT/EP2020/079108
§ 371 (c)(1),
(2) Date: Mar. 29, 2023

(87) PCT Pub. No.: WO2022/078608
PCT Pub. Date: Apr. 21, 2022

(65) Prior Publication Data
US 2023/0379029 A1    Nov. 23, 2023

(51) Int. Cl.
*H04B 7/06*    (2006.01)
*H04B 17/336*    (2015.01)

(52) U.S. Cl.
CPC ......... *H04B 7/0626* (2013.01); *H04B 17/336* (2015.01)

(58) Field of Classification Search
None
See application file for complete search history.

(56) References Cited

U.S. PATENT DOCUMENTS

| | | | |
|---|---|---|---|
| 10,804,993 B2 | 10/2020 | Onggosanusi et al. | |
| 2014/0313912 A1 | 10/2014 | Jongren et al. | |
| 2020/0022040 A1* | 1/2020 | Chen ................ | H04W 36/0085 |
| 2020/0076490 A1* | 3/2020 | Onggosanusi ........ | H04L 5/0055 |
| 2020/0136700 A1 | 4/2020 | Bogale et al. | |

FOREIGN PATENT DOCUMENTS

| | | |
|---|---|---|
| WO | 2020/118501 A1 | 6/2020 |
| WO | 2020/144602 A1 | 7/2020 |
| WO | 2020/147076 A1 | 7/2020 |

(Continued)

OTHER PUBLICATIONS

"3rd Generation Partnership Project; Technical Specification Group Radio Access Network; NR; Physical layer procedures for control (Release 16)", 3GPP TS 38.213, V16.1.0, Mar. 2020, pp. 1-156.

(Continued)

*Primary Examiner* — Minh Trang T Nguyen
(74) *Attorney, Agent, or Firm* — Carter, DeLuca & Farrell LLP

(57) ABSTRACT

Example embodiments provide signaling and configuration for model-based channel state information reporting by an apparatus. Instead of reporting a table of indices or quantized values in case of a several hypotheses, coefficients of a model for requested channel state information may be reported. Apparatuses, methods, and computer programs are disclosed.

18 Claims, 7 Drawing Sheets

(56) References Cited

FOREIGN PATENT DOCUMENTS

WO  2020/147104 A1  7/2020
WO  2020/150936 A1  7/2020

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Multiplexing and channel coding (Release 16)", 3GPP TS 38.212, V16.1.0, Mar. 2020, pp. 1-146.

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Physical layer measurements (Release 16)", 3GPP TS 38.215, V16.2.0, Jun. 2020, pp. 1-25.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

Chung et al., "Opportunistic scheduling with economized CSI feedback for OFDMA/TDD downlink systems", IEEE 20th International Symposium on Personal, Indoor and Mobile Radio Communications, Sep. 13-16, 2009, pp. 1391-1395.

Vora et al., "CSI Classification for 5G via Deep Learning", IEEE 90th Vehicular Technology Conference (VTC2019-Fall), Sep. 22-25, 2019, 5 pages.

"IEEE 802.11", Wikipedia, Retrieved on Apr. 25, 2023, Webpage available at : https://en.wikipedia.org/wiki/IEEE_802.11.

International Search Report and Written Opinion received for corresponding Patent Cooperation Treaty Application No. PCT/EP2020/079108, dated Jun. 23, 2021, 15 pages.

"Considerations on DL multi-panel and multi-TRP transmission", 3GPP TSG RAN WG1 Meeting NR#3, R1-1715798, Agenda: 6.2.1.6, CATT, Sep. 18-21, 2017, 4 pages.

"Enhancement to CSI Feedback", 3GPP TSG RAN WG1 Meeting #89, R1-1707915, Agenda: 6.2.4.3, Samsung, May 15-19, 2017, pp. 1-5.

\* cited by examiner

US 12,388,506 B2

APPARATUSES AND METHODS FOR CHANNEL STATE INFORMATION QUANTITIES MODEL REPORTING

RELATED APPLICATION

This application was originally filed as PCT Application No. PCT/EP2020/079108, filed on Oct. 15, 2020, which is incorporated herein by reference in its entirety.

TECHNICAL FIELD

The present application generally relates to information technology. In particular, some example embodiments of the present application relate to signaling and configuration of channel state information reporting.

BACKGROUND

5G NR (5th generation new radio) is endowed with a beamforming-based air interface. Several 5G features are dependent on accurate beamforming and channel state information (CSI). These features comprise, for example, beam management, URLLC (ultra reliable low latency communication), IAB (integrated access and backhaul), multi-TRP (multi transmission-reception point), multi-RAT (multi radio access technology) mobility and remote interference measurements. An increase in complexity of the CSI reporting framework may be inevitable in order to support more advanced technologies as the number of hypotheses for which CSI reporting is performed may increase. Hence, an improvement of the CSI reporting may be required due to challenging key performance indicators (KPI) of 5G and ever-increasing capabilities of user equipment (UE) devices.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable comprehensive channel state information reporting, wherein coefficients of a regression or a classification model may be reported instead of quantities for several hypotheses. This may be achieved by the features of the independent claims. Further implementation forms are provided in the dependent claims, the description, and the drawings.

According to a first aspect, an apparatus may comprise at least one processor; and at least one memory including computer program code; the at least one memory and the computer code configured to, with the at least one processor, cause the apparatus at least to obtain at least one channel state information reporting configuration, the channel state information reporting configuration indicating a model as format for reporting at least one channel state information quantity; compute values for the at least one channel state information quantity for a plurality of conditions based on the channel state information reporting configuration, measured channel measurement resources and measured interference measurement resources; determine values of the model representing the values of the at least one channel state information quantity for the plurality of conditions based on the channel state information reporting configuration; and transmit one or more channel state information reports comprising said determined values, wherein said determined values are configured to allow a further apparatus to determine values of the at least one channel state information quantity.

According to an example embodiment of the first aspect, said determined values may be configured to allow the further apparatus to determine quantized values of the at least one channel state information quantity.

According to an example embodiment of the first aspect, computing the values for the at least one channel state information quantity for the plurality of conditions may comprise computing at least one of a channel quality indicator based on a plurality of rank indicators, a channel quality indicator based on a plurality of interference hypotheses, a channel quality indicator based on a plurality of quasi-co-location assumptions, a reference signal received power based on a plurality of reference signal resource indicators, a reference signal received power based on a plurality of quasi-co-location assumptions, a reference signal strength indicator based on a plurality of reference signal resources, a signal to interference and noise ratio based on a plurality of reference signal resource indicators, or a signal to interference and noise ratio based on a plurality of quasi-co-location assumptions.

According to an example embodiment of the first aspect, the number of the rank indicators may correspond to at least one of a maximum rank value indicated by the channel state information reporting configuration or a number of antenna elements of the apparatus.

According to an example embodiment of the first aspect, computing the channel quality indicator may comprise computing the channel quality indicator for at least one of a wideband or a plurality of sub-bands.

According to an example embodiment of the first aspect, said determined values may comprise at least one of coefficients characterizing a mathematical equation of the model, coefficients associated to scaling of the channel state information quantity values used to fit the model, reference coefficients or reference indicators.

According to an example embodiment of the first aspect, the at least one memory and the computer code may be further configured to, with the at least one processor, cause the apparatus to obtain at least one information element indicating parameters of the model for at least one of computation or reporting of the channel state information quantity based on the model.

According to an example embodiment of the first aspect, the information element may comprise at least one of a number of features on which channel state information quantity values are fitted to determine the values of the model, designations of features on which channel state information quantity values are fitted to determine the values of the model, a number of bits for model values quantization, or at least one coefficient characterizing the model equation.

According to an example embodiment of the first aspect, the channel state information reporting configuration may comprise a plurality of models for reporting the at least one channel state information quantity; and wherein the at least one memory and the computer code may be further configured to, with the at least one processor, cause the apparatus to obtain an indication of which of the models is used for reporting the at least one channel state information quantity.

According to an example embodiment of the first aspect, the channel state information reporting configuration may comprise a plurality of models for reporting the at least one channel state quantity; and wherein the at least one memory and the computer code may be further configured to, with the at least one processor, cause the apparatus to determine which model is used for reporting the at least one channel state information quantity; and wherein the channel state information report comprises an indication of the used model.

According to an example embodiment of the first aspect, the at least one memory and the computer code may be further configured to, with the at least one processor, cause the apparatus to transmit an indication of which models are supported by the apparatus.

According to a second aspect, an apparatus may comprise at least one processor; and at least one memory including computer program code; the at least one memory and the computer code configured to, with the at least one processor, cause the apparatus at least to receive an indication of supported models from a client node; and transmit a channel state information reporting configuration to the client node comprising at least one of the supported models as a format for reporting at least one channel state information quantity.

According to an example embodiment of the second aspect, the at least one memory and the computer code may be further configured to, with the at least one processor, cause the apparatus to receive a channel state information report from the client node, the channel state information report comprising values of a model representing values of at least one channel state information quantity for a plurality of conditions; and derive channel state information quantity values based on the received values of the model and on the channel state information reporting configuration used by the client node to compute the model.

According to an example embodiment of the second aspect, the received values may comprise at least one of coefficients characterizing a mathematical equation of the model, coefficients associated to scaling of channel state information quantity values used to fit the model, reference coefficients or reference indicators.

According to a third aspect, a method may comprise obtaining at least one channel state information reporting configuration, the channel state information reporting configuration indicating a model as format for reporting at least one channel state information quantity; computing values for the at least one channel state information quantity for a plurality of conditions based on the channel state information reporting configuration, measured channel measurement resources and measured interference measurement resources; determining values of the model representing values of the at least one channel state information quantity for the plurality of conditions based on the channel state information reporting configuration; and transmitting one or more channel state information reports comprising said determined values, wherein said determined values are configured to allow a further apparatus to determine values of the at least one channel state information quantity.

According to an example embodiment of the third aspect, said determined values may be configured to allow the further apparatus to determine quantized values of the at least one channel state information quantity.

According to an example embodiment of the third aspect, computing the values for the at least one channel state information quantity for the plurality of conditions may comprise computing at least one of a channel quality indicator based on a plurality of rank indicators, a channel quality indicator based on a plurality of interference hypotheses, a channel quality indicator based on a plurality of quasi-co-location assumptions, a reference signal received power based on a plurality of reference signal resource indicators, a reference signal received power based on a plurality of quasi-co-location assumptions, a reference signal strength indicator based on a plurality of reference signal resources, a signal to interference and noise ratio based on a plurality of reference signal resource indicators, or a signal to interference and noise ratio based on a plurality of quasi-co-location assumptions.

According to an example embodiment of the third aspect, the number of the rank indicators may correspond to at least one of a maximum rank value indicated by the channel state information reporting configuration or a number of antenna elements.

According to an example embodiment of the third aspect, computing the channel quality indicator may comprise computing the channel state information for at least one of a wideband or a plurality of sub-bands.

According to an example embodiment of the third aspect, said determined values may comprise at least one of coefficients characterizing a mathematical equation of the model, coefficients associated to scaling of the channel state information quantity values used to fit the model, reference coefficients or reference indicators.

According to an example embodiment of the third aspect, the method may further comprise obtaining at least one information element indicating parameters of the model for at least one of computation or reporting of the channel state information quantity based on the model.

According to an example embodiment of the third aspect, the information element may comprise at least one of a number of features on which channel state information quantity values are fitted to determine the values of the model, designations of features on which channel state information quantity values are fitted to determine the values of the model, a number of bits for model values quantization, or at least one coefficient characterizing the model equation.

According to an example embodiment of the third aspect, the channel state information reporting configuration may comprise a plurality of models for reporting the at least one channel state information quantity; and the method may further comprise obtaining an indication of which of the models is used for reporting the at least one channel state information quantity.

According to an example embodiment of the third aspect, the channel state information reporting configuration may comprise a plurality of models for reporting the at least one channel state information quantity; and the method may comprise determining which model is used for reporting the at least one channel state information quantity; and wherein the channel state information report may comprise an indication of the used model.

According to an example embodiment of the third aspect, the method may comprise transmitting an indication of which models are supported.

According to a fourth aspect, a method may comprise receiving an indication of supported models from a client node; and transmitting a channel state information reporting configuration to the client node comprising at least one of the supported models as a format for reporting at least one channel state information quantity.

According to an example embodiment of the fourth aspect, the method may comprise receiving a channel state information report from the client node, the channel state information report comprising values of a model representing values of at least one channel state information quantity for a plurality of conditions; and deriving channel state information quantity values based on the received values of the model and on the channel state information reporting configuration used by the client node to compute the model.

According to an example embodiment of the fourth aspect, the received values may comprise at least one of coefficients characterizing a mathematical equation of the model, coefficients associated to scaling of channel state information quantity values used to fit the model, reference coefficients or reference indicators.

According to a fifth aspect, a computer program may be configured, when executed by a processor, to cause an apparatus at least to perform the following: obtaining at least one channel state information reporting configuration, the channel state information reporting configuration indicating a model as a format for reporting at least one channel state information quantity; computing values for the at least one channel state information quantity for a plurality of conditions based on the channel state information reporting configuration, measured channel measurement resources and measured interference measurement resources; determining values of the model representing values of the at least one channel state information quantity for the plurality of conditions based on the channel state information reporting configuration; and transmitting one or more channel state information reports comprising said determined values, wherein said determined values are configured to allow a further apparatus to determine values of the at least one channel state information quantity. The computer program may further comprise instructions for causing the apparatus to perform any example embodiment of the method of the third aspect.

According to a sixth aspect, an apparatus may comprise means for obtaining at least one channel state information reporting configuration, the channel state information reporting configuration indicating a model as a format for reporting at least one channel state information quantity; computing values for the at least one channel state information quantity for a plurality of conditions based on the channel state information reporting configuration, measured channel measurement resources and measured interference measurement resources; determining values of the model representing values of the at least one channel state information quantity for the plurality of conditions based on the channel state information reporting configuration; and transmitting one or more channel state information reports comprising said determined values, wherein said determined values are configured to allow a further apparatus to determine values of the at least one channel state information quantity. The apparatus may further comprise means for performing any example embodiment of the method of the third aspect.

According to a seventh aspect, a computer program may comprise instructions for causing an apparatus to perform at least the following: receiving an indication of supported models from a client node; and transmitting a channel state information reporting configuration to the client node comprising at least one of the supported models as a format for reporting at least one channel state information quantity. The computer program may further comprise instructions for causing the apparatus to perform any example embodiment of the method of the fourth aspect.

According to an eighth aspect, an apparatus may comprise means for receiving an indication of supported models from a client node; and transmitting a channel state information reporting configuration to the client node comprising at least one of the supported models as a format for reporting at least one channel state information quantity. The apparatus may further comprise means for performing any example embodiment of the method of the fourth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

Like references are used to designate like parts in the accompanying drawings.

DETAILED DESCRIPTION

Figure 1:
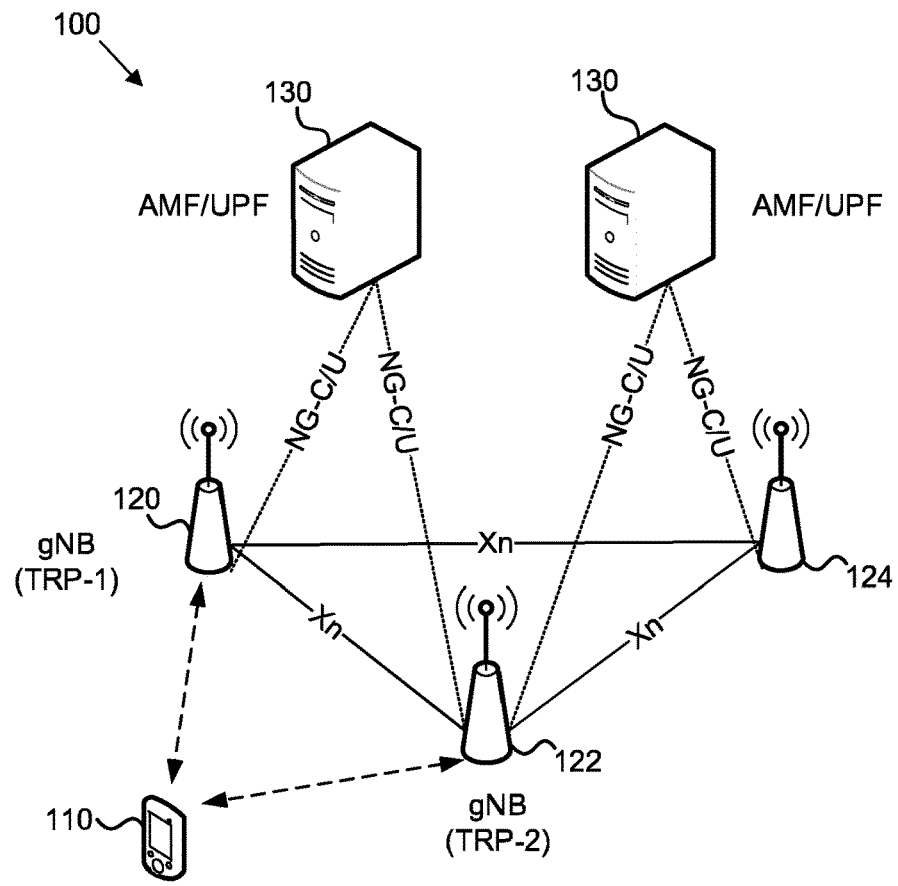
FIG. 1 illustrates an example of a communication network comprising network nodes and a client node according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

A CSI report may contain several CSI quantities, such as SSB RSRP (synchronization signal block reference signal received power), CQI (channel quality indicator), PMI (precoder matrix indicator), RI (rank indicator), etc. Total payload of the CSI report is a special concern as it may condition needed uplink resources for CSI reporting over PUSCH (physical uplink shared channel) or PUCCH (physical uplink control channel). For example, in case of aperiodic CSI reporting, a network node may trigger several CSI reports via trigger state indication in uplink scheduling DCI (downlink control information). Different CSI reports may relate to different interference hypotheses, different PMI codebook configurations, CQI format (wide-band or per sub-band), CQI tables, different measurement resources configurations (CMR, channel measurement resource; IMR, interference measurement resource), and maximum PMI ranks.

In situations where a client node is expected to report CSI quantities for several interference hypotheses, channel ranks or channel state information reference signal resource indicator (CRI), a considerable strain is put on uplink resources for the CSI reporting. CSI priority and omission rules may be provided to help the client node in handling the cases where the scheduled uplink resources for CSI reporting fall short from fitting all the CSI reports in a payload. However, CSI omission needs to be avoided as much as possible in order to maintain smooth system operations and avoid wasting measurements and resources.

Additionally, CSI quantities may be computed with given assumptions. For example, a channel quality indicator (CQI) may be computed based on a given precoder matrix indicator (PMI), CSI-RS resource indicator (CRI), and rank indicator (RI). Consequently, link adaptation at a network node side may suffer in case of rank override which may be quite frequent in MU-MIMO (multi-user, multiple input, multiple output) use cases.

One particularly problematic scenario is when several transmission reception points (TRP) trigger CSI reporting with several interference hypotheses. In this case, the client node may need to indicate CQI for each of the interference hypotheses, for a given rank combination, in case of a joint transmission. The number of interference hypotheses may depend on QCL (quasi-co-location) assumptions for channel and interference measurement resources, respectively.

Another problematic scenario may be above 52.6 GHz communications. Therein, the network needs to cope with a large number of beams as the number of antenna elements increases with the frequency range. Therefore, CSI reporting for quantities like physical layer reference signal received power (L1-RSRP), received signal strength indicator (RSSI), CQI and physical layer signal to interference and noise ratio (L1-SINR) may eventually require a substantial overhaul.

An example embodiment may provide a novel and a comprehensive CSI reporting framework especially for the problematic cases where CSI quantities need to be reported for multiple hypotheses or assumptions. The proposed framework for CSI reporting quantities with multiple hypotheses (e.g. interference, QCL assumption, resource indicator) may support, among others, RSRP, RSSI, SINR, and CQI reporting. An extensive reporting overhead reduction may be provided by the CSI reporting framework. In an embodiment, a given CSI quantity may be reported for different indices. This may comprise CQI reporting for several interference hypotheses and/or channel ranks, RSRP and/or SINR reporting for several beams and/or downlink reference signal (DL-RS) resource indicators and/or RSSI reporting for several reference signal resources.

An example embodiment provides a model-based method for reporting values of at least one CSI quantity. A client node may report back a model instead of the values of the CSI quantities for several hypotheses. The idea is based on two key observations. Firstly, the total payload of CSI reports may dependent on the considered hypotheses and assumptions, such as interference hypotheses, a maximum rank, a QCL assumption or a measurement resources size. Secondly, in order to compress the total payload, differential quantization, measurements omission, and/or reporting quantity bit-width reduction may be used. The client node may omit measurements that it already did for the sake of overhead reduction, for example, by reporting RSRP for a subset of measured resources, reporting CQI/PMI for a subset of interference hypotheses or reporting CQI for only one rank although the client node already made the computations for several ranks. The proposed CSI reporting framework, on the other hand, may enable CSI quantity feedback for more hypotheses and reducing the waste of otherwise usable information. In the CSI reporting framework, for a given CSI quantity that was computed for multiple resource indicators, interference hypotheses or ranks, values of a configured or dynamically indicated model may be reported instead of a table of indices or quantized values.

According to an example embodiment, a client node may receive a signaling information comprising at least a CSI reporting configuration, wherein a reporting format of at least one CSI quantity is set to a model. The client node may be configured to transmit computed values of the at least one CSI reporting quantity as a model, for example, to a network node or another client node. The client node may perform fitting of the model for the measured values of the CSI quantity by taking one of an assumption, a hypothesis, an index or a rank as an evaluation feature, and the CSI quantity in question as the feature to be fitted by the model. The client node may be configured with one or more models and their needed characteristics for CSI computation and reporting.

Advantages of example embodiments may comprise enabling a client node to convey more information regarding a radio link while avoiding a bottleneck in uplink reporting resources. Further, waste of already made measurements may be avoided. For example, in case of large look-up spaces with different hypotheses in terms of a QCL assumption, a channel rank, resource indicators and interference, simply feeding back quantities per-hypothesis may be wasteful for uplink reporting resources. More advanced information representation schemes in the framework of CSI reporting may be provided.

FIG. 1 illustrates an example of a communication network comprising network nodes and a client node. The communication network 100 may comprise one or more core network elements 130 such as for example access and mobility management function (AMF) and/or user plane function (UPF), one or more base stations, represented by gNBs 120, 122. The first gNB 120 may be also called a first transmission reception point (TRP-1). The second gNB 122 may be also called a second transmission reception point (TRP-2). The communication network 100 may further comprise other base stations such as gNB 124. The communication network 100 may further comprise one or more client nodes, which may be also referred to as a user nodes or UE. For example, the network may comprise a UE 110. The UE 110 may communicate with one or more of the base stations via wireless radio channel(s). Communications between UE 110, gNB 120, and gNB 122 may be bidirectional. Hence, any of the devices may be configured to operate as a transmitter and/or a receiver.

The base stations may be configured to communicate with the core network elements over a communication interface, such as for example a control plane interface or a user plane interface NG-C/U. Base stations may be also called radio access network (RAN) nodes and they may be part of a radio access network between the core network and the UEs.

Network elements AMF/UPF and gNB may be generally referred to as network nodes or network devices. Although depicted as a single device, a network node may not be a stand-alone device, but for example a distributed computing system coupled to a remote radio head.

The communication network 100 may be configured for example in accordance with the 5th Generation digital cellular communication network, as defined by the 3rd Generation Partnership Project (3GPP). In one example, the communication network 100 may operate according to 3GPP 5G-NR. It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

Figure 2:
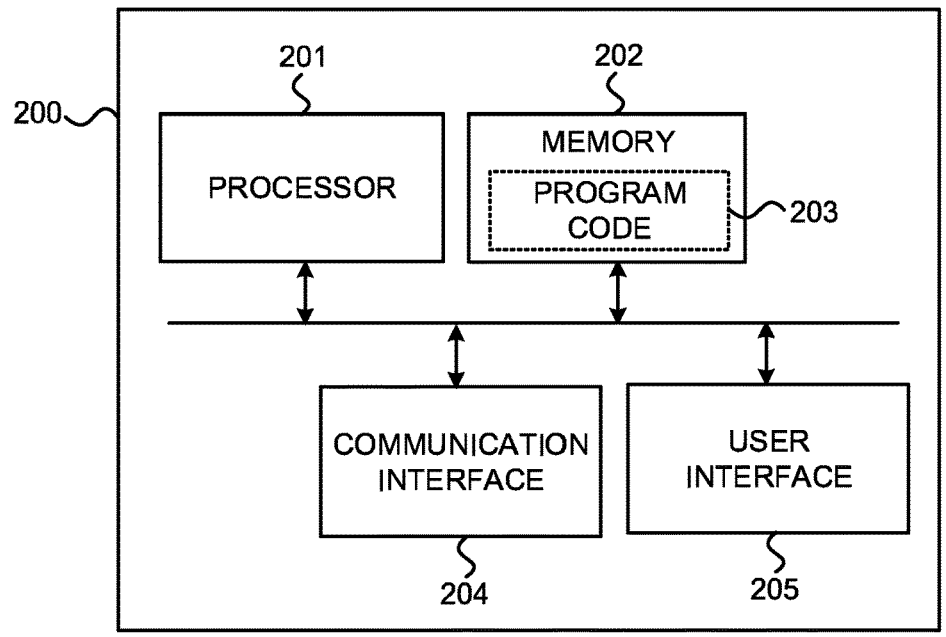
FIG. 2 illustrates an example of an apparatus configured to practice one or more example embodiments.

FIG. 2 illustrates an example of an apparatus 200 configured to practice one or more example embodiments. The apparatus 200 may be a client node, such as for example the UE 110. The network node may be, for example, a 5G node, such as the gNB 120, 122, and/or a 4G node, eNB.

The apparatus 200 may comprise at least one processor 201. The at least one processor 201 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 202. The memory 202 may be configured to store, for example, computer program code 203 or the like, for example operating system software and application software. The memory 202 may comprise one or more volatile memory devices, one or more non-volatile memory devices, and/or a combination thereof. For example, the memory 202 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise one or more communication interfaces 204 configured to enable apparatus 200 to transmit and/or receive information, to/from other apparatuses. The communication interface may be configured to provide at least one wireless radio connection, such as for example a 3GPP mobile broadband connection (e.g. 3G, 4G, 5G). However, the communication interface 204 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 204 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The apparatus 200 may further comprise a user interface 205 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 201 and/or the memory 202, may be configured to implement this functionality. Furthermore, when the at least one processor 201 is configured to implement some functionality, this functionality may be implemented using program code 203 comprised, for example, in the memory 202.

The functionality described herein may be performed, at least in part, by one or more computer program product components such as software components. According to an embodiment, the apparatus 200 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 200 comprises means for performing at least one method described herein. In one example, the means comprises the at least one processor 201, the at least one memory 202 including program code 203 configured to, when executed by the at least one processor 201, cause the apparatus 200 to perform the method.

The apparatus 200 may comprise for example a computing device such as for example a base station, a network node, a server device, a client node, a mobile phone, a tablet computer, a laptop, or the like. In one example, the apparatus 200 may comprise a vehicle such as for example a car. Although the apparatus 200 is illustrated as a single device it is appreciated that, wherever applicable, functions of apparatus 200 may be distributed to a plurality of devices.

A client node may be configured to report CQI conditioned on a PMI, RI and CRI for a given CSI reporting configuration. After the CSI report is received from the client node, a network node may have a valid CQI for only a given channel rank. However, the network node may decide to override the rank of the transmission by reducing the number of spatial streams compared to the reported RI, especially in MU-MIMO scenarios. Therefore, link adaptation may suffer. In this scenario, the network node may not have an error-proof method to derive a proper CQI for ranks lower than the reported RI while techniques like OLLA (open loop link adaptation) are prone to inaccuracies and increased latency as they depend on ACK/NACK feedback. Yet, an optimal link adaptation may be critical for 5G NR, especially with high modulation order. An example embodiment may provide CSI reporting also for high rank channels, as described in the next sections.

Figure 3:
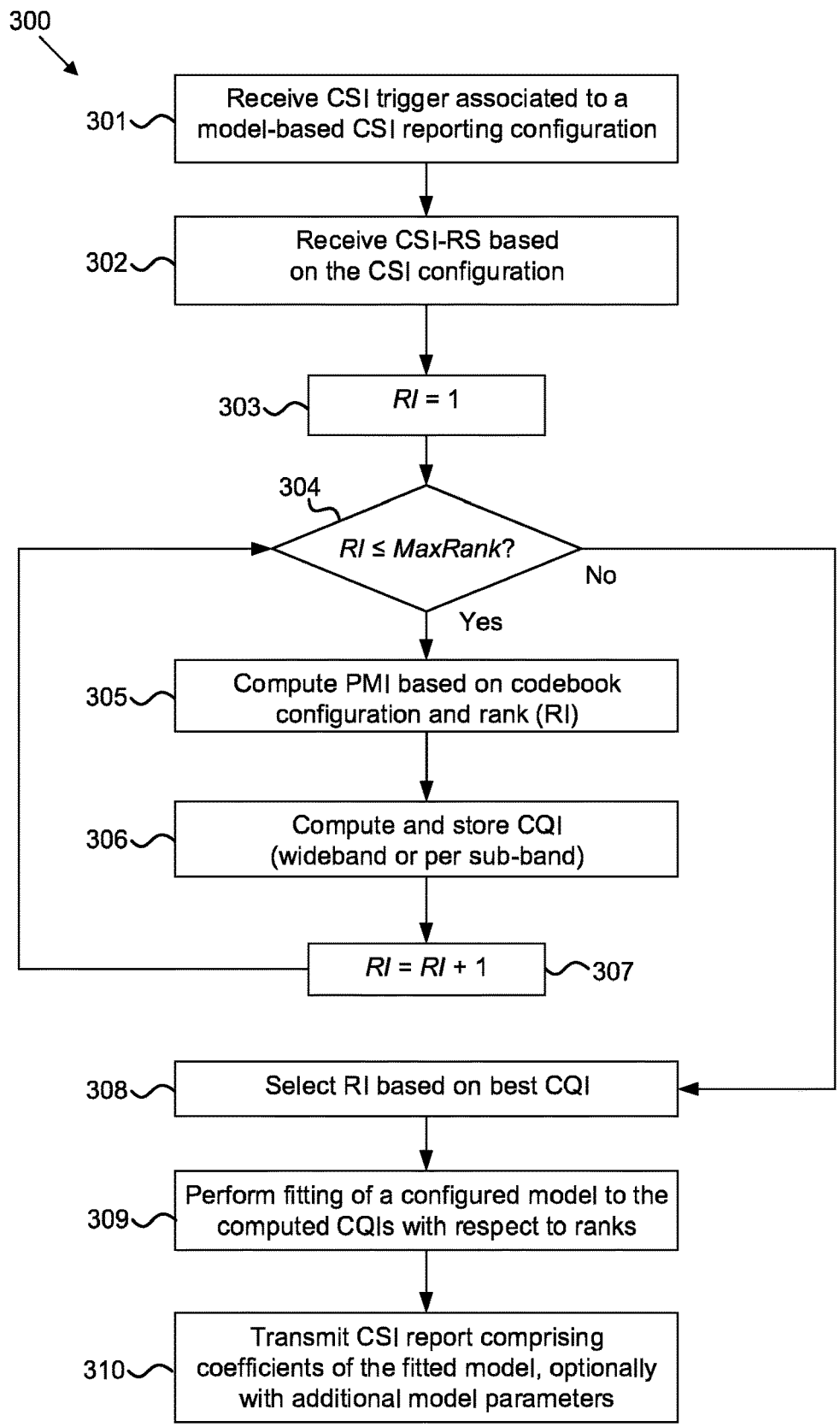
FIG. 3 illustrates a flowchart of calculation of a channel quality indicator based on multiple ranks for a model and insertion of coefficients of the model in uplink control information according to an example embodiment.

FIG. 3 illustrates a flowchart of calculation of a channel quality indicator based on multiple ranks for a model and insertion of coefficients of the model in uplink control information according to an example embodiment. The procedure of FIG. 3 may be executed at a client node such as the UE 110.

At 301, a CSI trigger may be received. The CSI trigger may be associated to a model-based CSI reporting configuration. The CSI reporting configuration may indicate a model for reporting one or more CSI quantities. In an embodiment, the model may a regression model. In an embodiment, the model may be a classification model. In an embodiment, the CSI reporting configuration may comprise a list of possible models for reporting the one or more CSI quantities. In an embodiment, the client node may further receive at least one information element associated to the configured model. The information element may indicate characteristics of the configured model for CSI computation and reporting. The information element may indicate, for example, parameters for a polynomial power for a polynomial regression, a number of features on which channel state information quantity values may be fitted to determine values for the model, designations of features on which channel state information quantity values may be fitted to determine values for the model, a number of quantization bits for coefficients of the regression or classification model and/or at least one coefficient characterizing the model equation.

In an embodiment, a plurality of models may be assigned for different types of links the client node may provide reporting for. Alternatively, the plurality of models may be used for CSI refinement of the same type of a link. In an embodiment, a network node may be configured to indicate a specific model from the plurality of the client node needs to use for the CSI reporting. Alternatively, or in addition, the network node may be configured to indicate a switch from one model to another model. The different links may be, for example, ultra-reliable low-latency communication or enhanced mobile broadband, where different CSI accuracy may be needed.

At 302, a channel state information reference signal (CSI-RS) may be received based on the CSI configuration.

At 303, an initial rank indicator (RI) may be determined for CSI measurements. The CSI measurements may be performed for a plurality of rank indicators, starting from the initial value and ending to a maximum rank value. The CSI measurements may be set to start from a rank indicator value of 1. In an embodiment, the maximum rank value may be indicated by the CSI reporting configuration. In an embodiment, the maximum rank value may be defined by capabilities of the client node, for example, based on the number of antenna elements of the client node.

At 304, it is determined if the RI is lower than or equal to the maximum rank value. If the RI is lower or equal to the maximum rank value, at 305, a precoder matrix indicator (PMI) may be computed based on a codebook configuration and the RI.

The procedure may proceed to 306, wherein a channel quality indicator may be computed and stored. The CQI may be computed at least one of for a wideband or for a plurality of sub-bands. The CQI may be computed based on the PMI, RI and CSI-RS for channel and for interference measurements. Thereafter, at 307, the rank indicator value may be increased by one. The operations 304, 305, 306, and 307 may be repeated for the rank indicators until the maximum rank value is exceeded. After the CQI is computed and stored based on each RI lower or equal to the maximum rank value, one of the rank indicators may be selected based on a highest CQI at 308.

At 309, fitting of the model to the computed CQIs may be performed with respect to the rank indicators. In an embodiment, a specific model may be indicated by a network node from the plurality of models for the fitting. In an embodiment, the specific model for the fitting is determined by the client node, and the client node may be configured to indicate the model used for the fitting to the network node.

At 310, a CSI report comprising coefficients of the fitted model for the channel quality indicators may be transmitted to the network node in uplink control information. The coefficients may be values of the model representing the values of the CSI quantity for the plurality of conditions. The coefficients may allow the network node to determine values of the CSI quantity, which may comprise quantized values of the CSI quantity. In an embodiment, the coefficients may characterize a mathematical equation of the used regression or classification model. In an embodiment, the CSI report may comprise additional model coefficients associated to scaling the values of the CSI quantity used to fit the regression or classification model, reference coefficients or reference indicators. The additional model coefficients may be used by the network node for reference or scaling of the fitted model. The CSI report may further comprise the rank indicator associated with the highest CQI.

Figure 4:
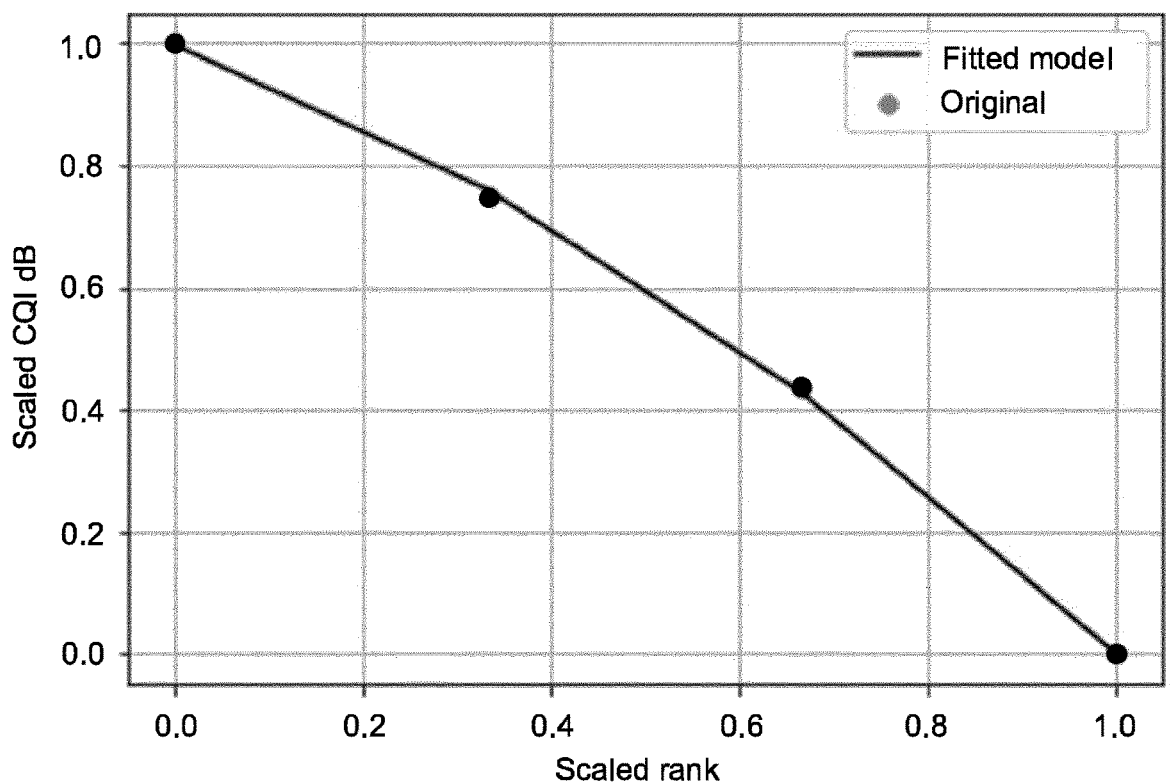
FIG. 4 illustrates simulation results of a fitted model for wideband channel quality indicator according to an example embodiment.
Figure 5:
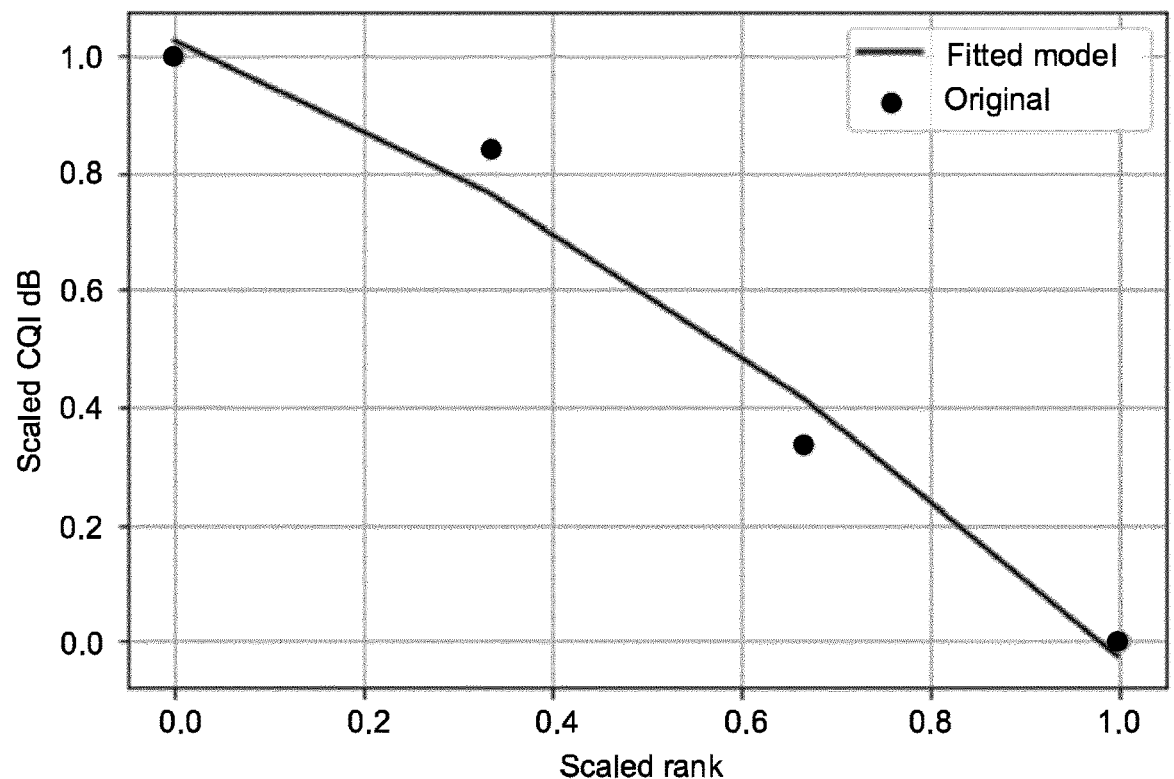
FIG. 5 illustrates simulation results of another fitted model for a wideband channel quality indicator according to an example embodiment.

An example embodiment may provide the network node capabilities to obtain a valid wideband or per-sub-band CQI for any rank in [1, . . . , highest rank indicator]. This enables, that performing erroneous link adaptation may be avoided, which provides substantial performance improvement, especially in MU-MIMO use cases. As previously described, the network node may override the choice of the client node for the RI, corresponding to the highest CQI, and schedule a number of layers smaller than the selected RI. In this case, the network node needs to adapt its link adaptation to the new rank while it may have CQI value only for the one RI. Advantageously, the network node may derive a valid CQI for any rank smaller or equal to the highest RI based on the coefficients of the fitted model. The accuracy of the proposed CQI modelling approach and the expected CSI overhead savings is illustrated in FIGS. 4 and 5. FIGS. 4 and 5 illustrate diagrams of simulation results of a fitted model for wideband CQI and original results of CQIs with respect to multiple RIs. The simulations are performed with a system level simulator using a maximum rank value of 4 and a Rel-16 enhanced type II codebook for a single TRP transmission case. In both diagrams of FIG. 4 and FIG. 5, a polynomial regression is used to model the wideband CQI.

Figure 6:
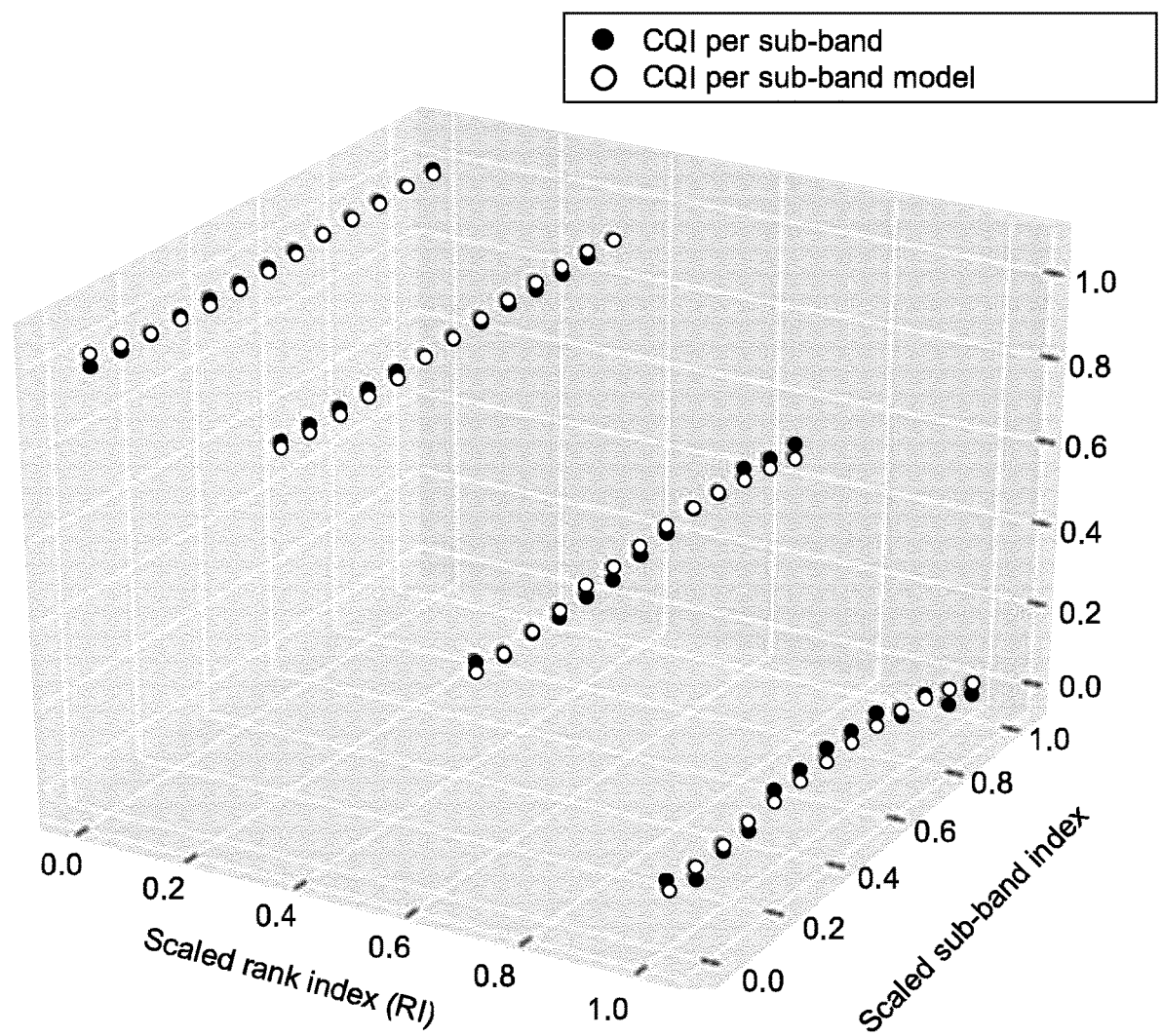
FIG. 6 illustrates simulation results of a fitted model for a channel quality indicator for a plurality of sub-bands according to an example embodiment.

FIG. 6 illustrates an example of a diagram of simulation results of a fitted model for CQI for a plurality of sub-bands, according to an example embodiment. Simulation parameters for the per sub-band CQI modelling comprises a maximum rank value of 4, a PMI codebook Rel-16 enhanced type II codebook and 13 CQI sub-bands with 4 PRBs (physical resource blocks) per sub-band, wherein a polynomial regression is used for the CQI modelling. The model may be fully characterized by a total of 11 coefficients: 9 polynomial coefficients and CQI indices for a maximum CQI and for a minimum CQI for min-max scaling. The needed payload may be compared to a report per sub-band CQI for 4 rank indicators with 13 sub-bands requiring 4 CQI indices for wideband CQI (16 bits) and 2 bits per sub-band per rank (104 bits), in total 120 bits. The proposed CQI modelling, on the other hand, requires 9 coefficients indices (36 bits) and 2 CQI indices for scaling (8 bits), only 44 bits in total. Consequently, the proposed method enables a gain in CSI reporting overhead of 76 bits, in this particular case.

A relatively large number of cooperating TRPs may cause a high number of interference hypotheses. This may result in excessive overhead over uplink channels as the number of interference hypotheses scales with the number of cooperating TRPs and CMR/IMR QCL assumptions. Further, the CSI reporting configuration may also have to account for a number of streams from each TRP. Hence, CQI reporting may be required for multiple ranks with additional complication of multiple TRPs. The proposed CSI quantity model reporting may be used to compress CQI report across interference hypotheses, as described in association with FIG. 7.

Figure 7:
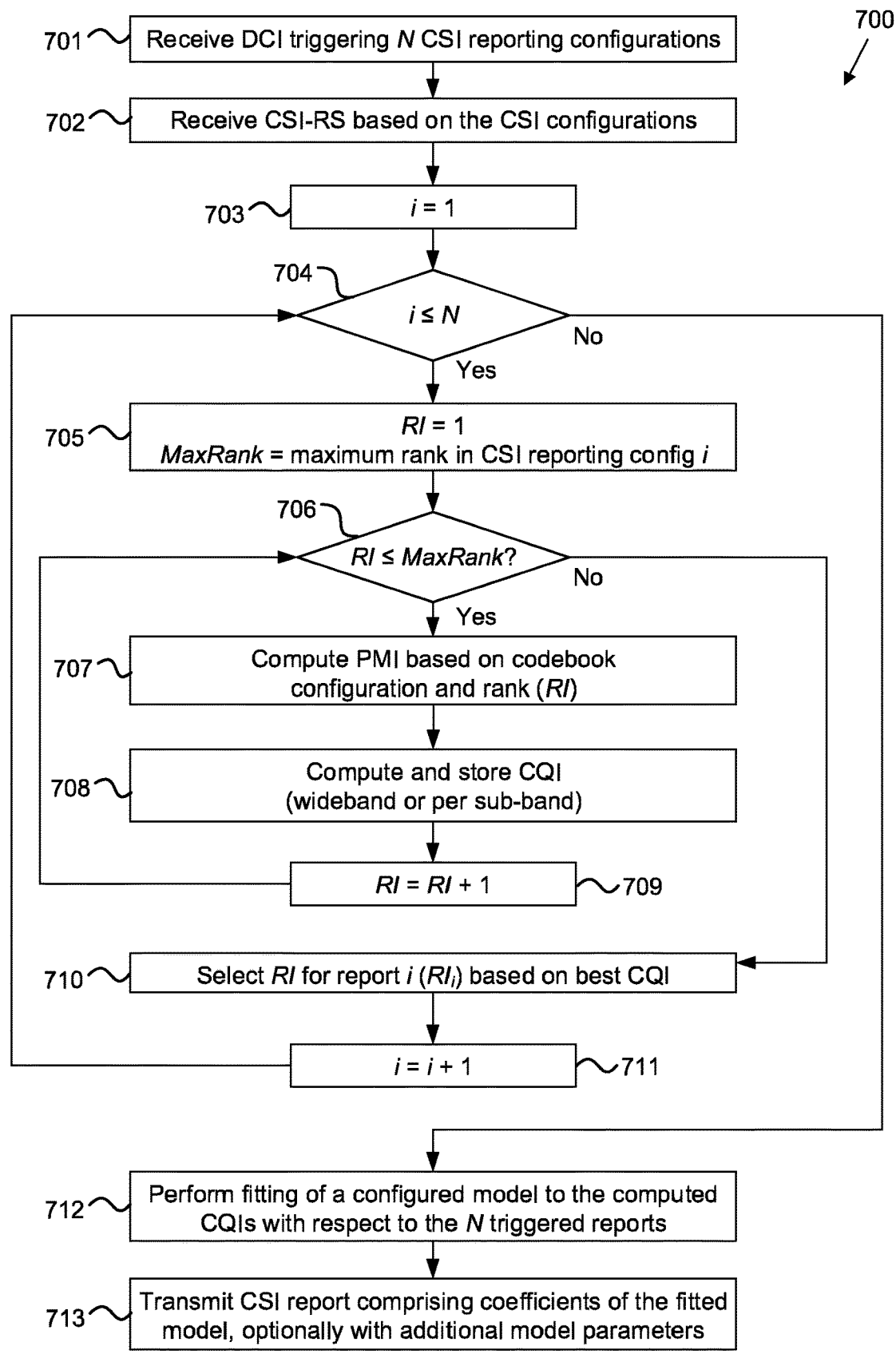
FIG. 7 illustrates a flow chart of calculation of a channel quality indicator based on multiple interference hypotheses for a model and insertion of coefficients of the model in uplink control information according to an example embodiment.

FIG. 7 illustrates an example of a flow chart 700 for calculation of a channel quality indicator for multiple interference hypotheses for a model and insertion of coefficients of the model in uplink control information, according to an example embodiment. The procedure of FIG. 7 may be executed at a client node such as the UE 110.

At 701, downlink control information triggering N CSI reporting configurations may be received. N may indicate the number of CSI reporting configurations, wherein N>1. In an embodiment, a network node may trigger a plurality of CSI reports via trigger state indication in uplink scheduling DCI for aperiodic CSI reporting. The plurality of CSI reports may relate, for example, to different interference hypotheses, different PMI codebook configurations, CQI format in wideband or per sub-band, or to maximum PMI ranks. In an embodiment, the CSI reporting configuration may comprise one or more models for reporting one or more CSI quantities. The models may comprise, for example, one or more regression and/or classification models.

At 702, CSI-RS may be received based on the CSI configurations. At 703, a first CSI reporting configuration may be selected from the triggered N CSI reporting configurations. At 704, it may be determined if a sequence number i (1, . . . , N) of the selected CSI reporting configuration is lower or equal to the number N of the CSI reporting configurations. If the sequence number i is lower or equal to N, the procedure proceeds to 705.

At 705, a rank indicator may be set to 1, and a maximum rank value (MaxRank) may be set to a maximum rank based on the selected CSI reporting configuration. Alternatively, or in addition, the maximum rank value may be determined based on the number of antenna elements of the client node. At 706, it is determined if the rank indicator is lower or equal to the maximum rank value. If yes, at 707, a precoder matrix indicator may be computed based on a codebook configuration and the rank indicator. At 708, a channel quality indicator may be computed and stored. The channel quality indicator may be computed for a wideband or per sub-band for a plurality of sub-bands. The channel quality indicator may be computed based on the PMI, RI and CSI-RS for channel and interference measurements.

At 709, the value of the rank indicator may be increased by one. The operations 706, 707, 708 and 709 may be repeated for a plurality of rank indicator values until the value of the rank indicator exceeds the maximum rank value. Thereafter, at 710, one of the rank indicators may be selected for a CSI report associated with the respective CSI reporting configuration. The rank indicator may be selected based on a highest channel quality indicator value among the computed channel quality indicators.

At 711, the sequence number i may be increased by one and a next CSI reporting configuration is selected. The operations 704, 705, 706, 707, 708, 709, 710 and 711 may be repeated until the operations are performed for the N CSI reporting configurations.

At 712, fitting of a configured model to the computed CQIs may be performed with respect to each of the N triggered CSI reports. In an embodiment, the configured model may be selected by the client node from the one or more models indicated by the CSI reporting configuration for reporting CQI. Alternatively, the configured model may be indicated by the network node. The network node may indicate the model to be used, for example, via dynamic downlink signaling. In an embodiment, a CSI report identity may be used for indexing coefficients of the fitted model associated with a specific CSI reporting configuration. At 713, one or more CSI reports comprising coefficients characterizing the fitted models associated with the N CSI reporting configurations may be transmitted to the network node in uplink control information. In an embodiment, the CSI report may be transmitted with additional model parameters for reference and scaling. The network node may compute values of the one or more CSI quantities based on the received values associated with the used model representing the computed CSI quantity values for the plurality ranks.

Figure 8:
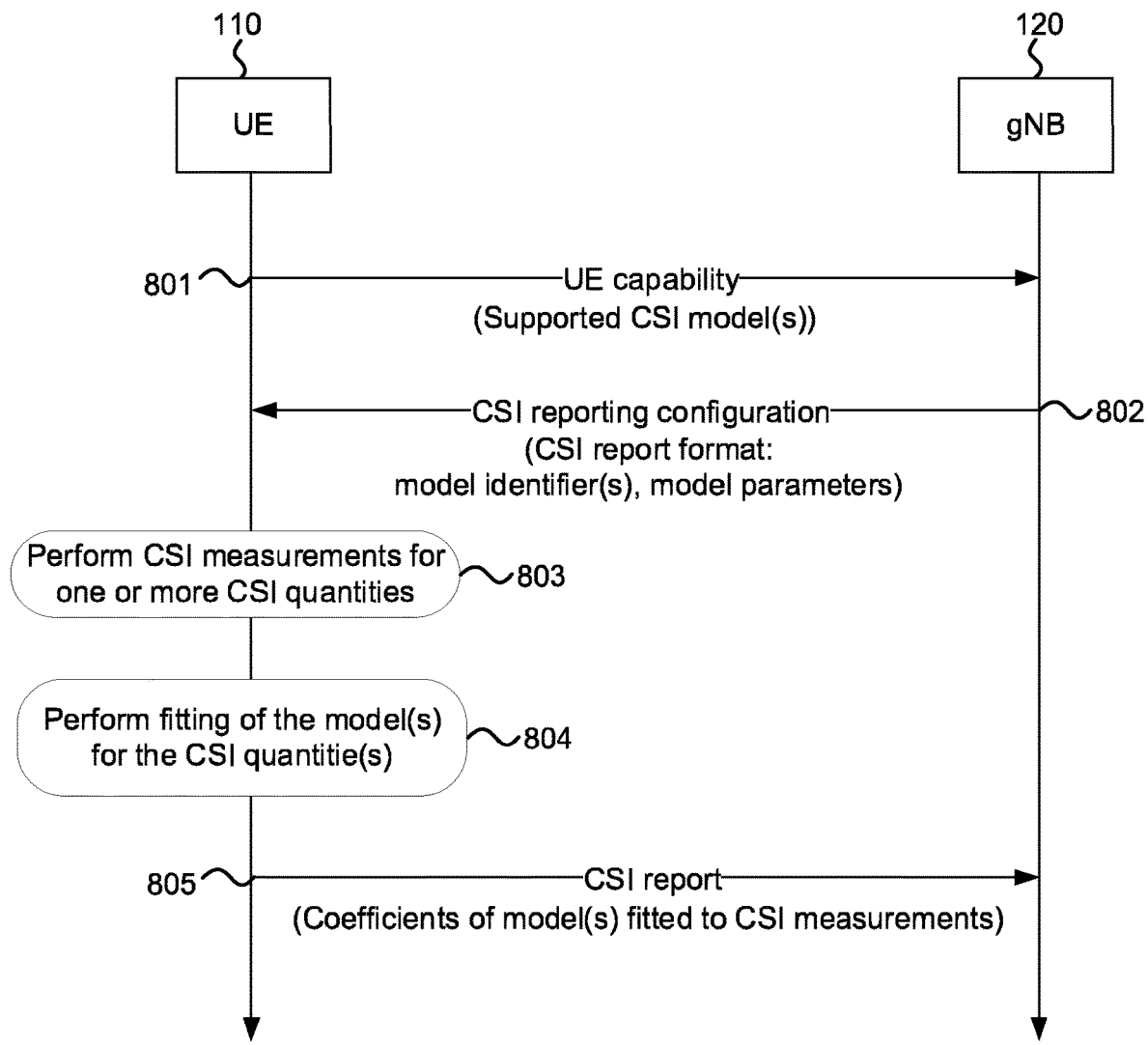
FIG. 8 illustrates an example of a message sequence chart for channel state information reporting from a client node to a network node according to an example embodiment.

FIG. 8 illustrates an example of a message sequence chart for channel state information reporting according to an example embodiment. The CSI reporting may be executed between a client node, such as the UE 110, and a network node, such as the gNB 120. In an embodiment, the CSI reporting may be executed between the client node, such as UE 110, and another device, such as another UE.

At 801, the UE 110 may transmit UE capability information to the gNB 120. The UE capability information may comprise indication of one or more models supported by the UE 110 for CSI reporting. The models may comprise at least one of a classification model or a regression model.

At 802, the UE 110 may receive, from the gNB 120, a CSI reporting configuration. The CSI reporting configuration may be indicated dynamically or semi-statically by the gNB 120. The CSI reporting configuration may comprise a CSI report format indicating an identifier of a model, such as the regression and/or classification model, for compressing one or more CSI quantities. In an embodiment, the CSI reporting configuration may comprise a list of model identifiers associated with reporting one or more CSI quantities. In an embodiment, one or more model types may be set for one CSI quantity. In an embodiment, one model type may be set for a plurality of CSI quantities. In an embodiment, the CSI reporting configuration may comprise model parameters associated with the one or more models. The model parameters may determine characteristics for computing and/or reporting the CSI quantities based on the model.

At 803, the UE 110 may perform CSI measurements for the one or more CSI quantities. The measurements may comprise, for example, computing PMI based on a codebook configuration and one or more ranks, and CQI based on the PMIs and CRI. The UE 110 may perform measurement of channel measurement resources and interference measurement resources and compute values for at least one CSI quantity based on the CSI reporting configuration and the measured resources. The at least one CSI quantity may comprise, for example, CQI, RSRP, SINR or RSSI. The CSI quantity may be reported for different indices. In an embodiment, the CSI reporting may comprise, for example, reporting CQI for several conditions such as interference hypotheses and/or ranks, reporting RSRP and/or SINR for several beams and/or DL-RS resource indicators or reporting RSSI for several reference signal resources.

At 804, the UE 110 may perform fitting of the one or more classification/regression models for the one or more CSI quantities. In an embodiment, the fitting may be performed, for example, for wideband and/or per sub-band CQI for one or more rank indicators. Alternatively, or in addition, the fitting may be performed for RSRP and/or RSSI and/or SINR for several reference signal resources or resource sets, or reference signal indicators. In an embodiment, a specific model for the fitting may be indicated to the client node by the network node via dynamic downlink signaling (MAC CE, DCI). In an embodiment, the specific model may be selected by the client node and indicated to the network node in uplink control information.

At 805, the UE 110 may transmit the CSI report to the gNB 120. The CSI report may comprise coefficients characterizing the one or more models fitted to the CSI measurements. In an embodiment, the CSI report may comprise additional coefficients to provide references or scaling of the used model to the gNB 120.

A single client node may have different types of traffic, e.g. URLLC and eMBB. URLLC and eMBB traffic may have different requirements and main KPIs, and therefore different CQI tables for CQI indices and respective interpretations may be selected by the network depending on the use case or scenario. A CSI report may not be optimally used for both types of traffic when the CSI report comprises CQI indices from only one table which, consequently, means that multiple reports may be needed. The present disclosure may address this issue by providing a CSI reporting model which may be computed with two different CQI tables, wherein additional coefficients are provided as reference and scaling. In this case, the client node may be configured with a channel state information reporting configuration where CQI format is set to a model and more than one CQI table is indicated. The client node may then fit the model to computed CQI values according to each of the indicated tables. Thereafter, the client node may feedback a single model with reference and scaling coefficients that correspond to each CQI table, respectively. When using the obtained model for link adaptation, the network node may change the scaling of the obtained values depending on the target bit error rate, thanks to the different scaling options that the client node provided.

Upon reception of the coefficients of the model, the gNB 120 may use it differently depending on the traffic type. For example, if URLLC traffic is scheduled the gNB 120 may perform the scaling of the model based on CQI indices from a table with 64QAM as the highest order modulation. Alternately, if eMBB traffic is considered, the gNB 120 may scale the model based on CQI tables that contain higher order modulation. Hence, reuse of the same CSI report may be enabled for link adaptation according to different traffic types.

An example embodiment may enable reducing CSI reporting overhead for multiple interference hypotheses, high rank channels and high frequency range communication with large number of narrow beams. Further, better link adaptation when a network node overrides PMI rank may be achieved. A more versatile CSI report may be provided as it may be used for link adaptation for different traffic types.

Figure 9:
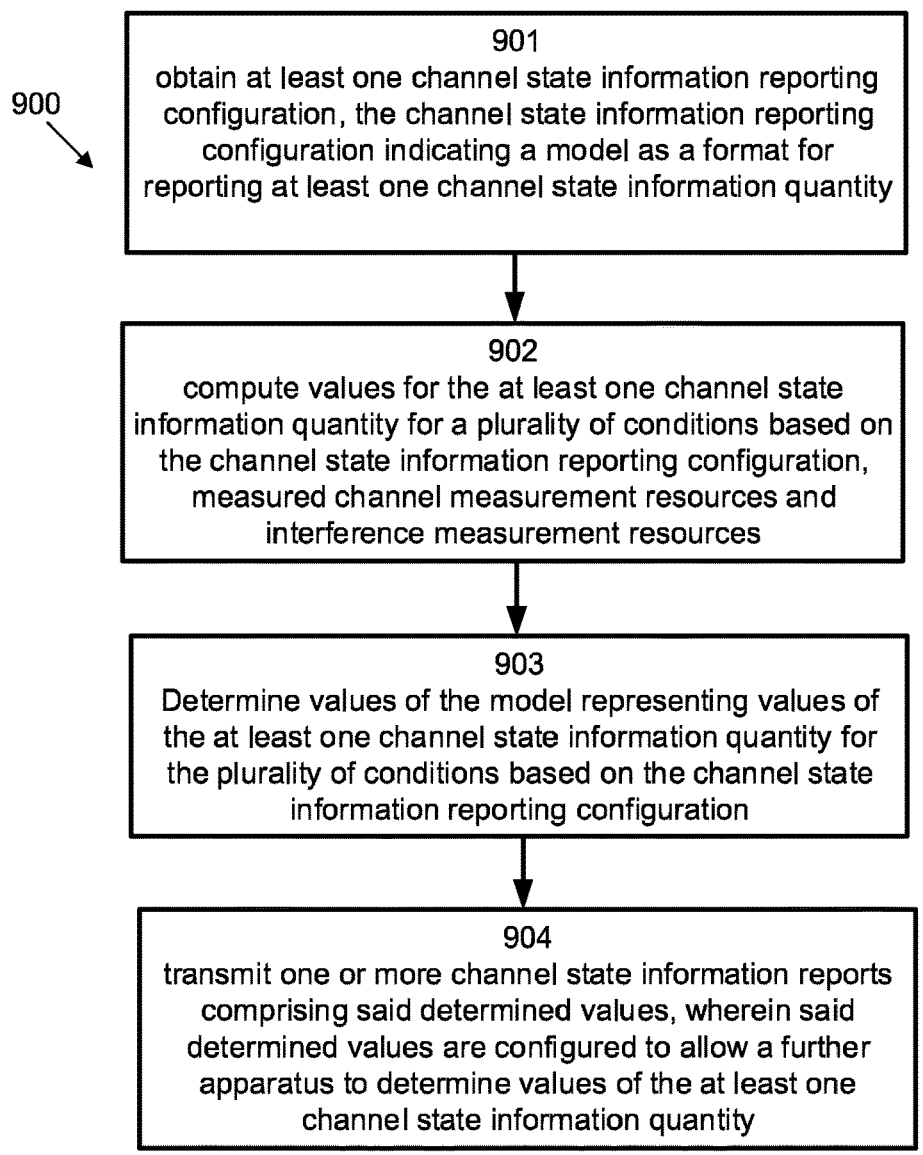
FIG. 9 illustrates a method for channel state information reporting by a client node according to an example embodiment.

FIG. 9 illustrates a method 900 for channel state information reporting by a client node according to an example embodiment.

At 901, the method may comprise obtaining at least one channel state information reporting configuration, the channel state information reporting configuration indicating a model as a format for reporting at least one channel state information quantity. The model may be, for example, a regression or a classification model.

At 902, the method may comprise computing values for the at least one channel state information quantity for a plurality of conditions based on the channel state information reporting configuration, measured channel measurement resources and measured interference measurement resources. The plurality of conditions may comprise, for example, a plurality of hypothesis.

At 903, the method may comprise determining values of the model representing values of the at least one channel state information quantity for the plurality of conditions based on the channel state information reporting configuration. The values may be determined by performing fitting of the model for the channel state information quantity values for the plurality of conditions based on the channel state information reporting configuration.

At 904, the method may comprise transmitting one or more channel state information reports comprising said determined values, wherein said determined values are configured to allow a further apparatus to determine values of the at least one channel state information quantity. The determined values may comprise coefficients of the fitted model. The determined values may be transmitted, for example, to a network node or another client node in uplink control signaling.

Figure 10:
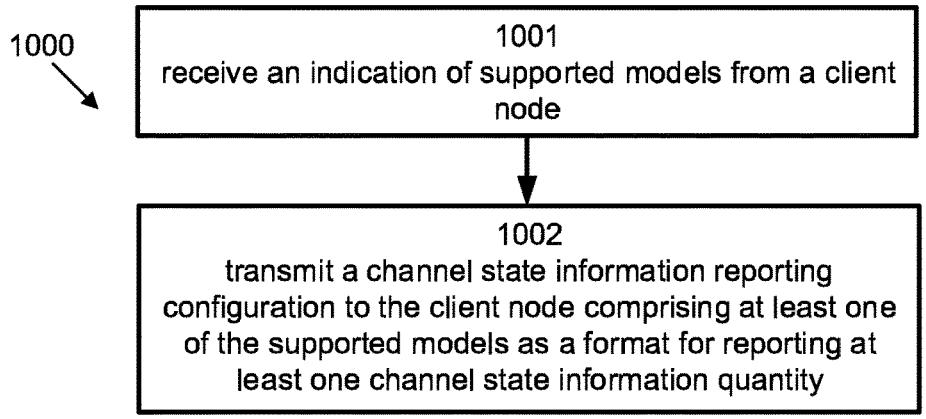
FIG. 10 illustrates a method for channel state information reporting configuration according to an example embodiment.

FIG. 10 illustrates a method 1000 for channel state information reporting configuration according to an example embodiment.

At 1001, the method may comprise receiving an indication of supported models from a client node. The models may comprise one or more regression and/or classification models.

At 1002, the method may comprise transmitting a channel state information reporting configuration to the client node comprising at least one of the supported models as a format for reporting at least one channel state information quantity.

Further features of the methods directly result from the functionalities and parameters of the apparatuses, as described in the appended claims and throughout the specification and are therefore not repeated here. It is noted that one or more operations of the method may be performed in different order.

An apparatus, for example a network node, a user node or a client node, may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
   at least one processor; and
   at least one memory including computer program code;
   the at least one memory and the computer code configured to, with the at least one processor, cause the apparatus at least to:
   obtain at least one channel state information reporting configuration, the channel state information reporting configuration indicating a model as a format for reporting at least one channel state information quantity;
   compute values for the at least one channel state information quantity for a plurality of conditions based on the channel state information reporting configuration, measured channel measurement resources and measured interference measurement resources;
   determine values of the model representing the values of the at least one channel state information quantity for the plurality of conditions based on the channel state information reporting configuration; and
   transmit one or more channel state information reports comprising said determined values, wherein said determined values are configured to allow a further apparatus to determine values of the at least one channel state information quantity.

2. The apparatus of claim 1, wherein said determined values are configured to allow the further apparatus to determine quantized values of the at least one channel state information quantity.

3. The apparatus of claim 1, wherein computing the values for the at least one channel state information quantity for the plurality of conditions comprises computing at least one of a channel quality indicator based on a plurality of rank indicators, a channel quality indicator based on a plurality of interference hypotheses, a channel quality indicator based on a plurality of quasi-co-location assumptions, a reference signal received power based on a plurality of reference signal resource indicators, a reference signal received power based on a plurality of quasi-co-location assumptions, a reference signal strength indicator based on a plurality of reference signal resources, a signal to interference and noise ratio based on a plurality of reference signal resource indicators, or a signal to interference and noise ratio based on a plurality of quasi-co-location assumptions.

4. The apparatus of claim 3, wherein the number of the rank indicators corresponds to at least one of a maximum rank value indicated by the channel state information reporting configuration or a number of antenna elements of the apparatus.

5. The apparatus of claim 3, wherein computing the channel quality indicator comprises computing the channel quality indicator for at least one of a wideband or a plurality of sub-bands.

6. The apparatus of claim 1, wherein said determined values comprise at least one of coefficients characterizing a mathematical equation of the model, coefficients associated to scaling of the channel state information quantity values used to fit the model, reference coefficients or reference indicators.

7. The apparatus of claim 1, wherein the at least one memory and the computer code are further configured to, with the at least one processor, cause the apparatus to:
   obtain at least one information element indicating parameters of the model for at least one of computation or reporting of the channel state information quantity based on the model.

8. The apparatus of claim 7, wherein the information element comprises at least one of a number of features on which channel state information quantity values are fitted to determine the values of the model, designations of features on which channel state information quantity values are fitted to determine the values of the model, a number of bits for model values quantization, or at least one coefficient characterizing the model equation.

9. The apparatus of claim 1, wherein
the channel state information reporting configuration comprises a plurality of models for reporting the at least one channel state information quantity; and
wherein the at least one memory and the computer code are further configured to, with the at least one processor, cause the apparatus to:
obtain an indication of which of the models is used for reporting the at least one channel state information quantity.

10. The apparatus of claim 1, wherein
the channel state information reporting configuration comprises a plurality of models for reporting the at least one channel state quantity; and
wherein the at least one memory and the computer code are further configured to, with the at least one processor, cause the apparatus to:
determine which model is used for reporting the at least one channel state information quantity; and wherein the channel state information report comprises an indication of the used model.

11. The apparatus of claim 1, wherein
the at least one memory and the computer code are further configured to, with the at least one processor, cause the apparatus to:
transmit an indication of which models are supported by the apparatus.

12. The apparatus of claim 11, wherein the received values comprise at least one of coefficients characterizing a mathematical equation of the model, coefficients associated to scaling of channel state information quantity values used to fit the model, reference coefficients or reference indicators.

13. A method, comprising:
obtaining at least one channel state information reporting configuration, the channel state information reporting configuration indicating a model as a format for reporting at least one channel state information quantity;
computing values for the at least one channel state information quantity for a plurality of conditions based on the channel state information reporting configuration, measured channel measurement resources and measured interference measurement resources;
determining values of the model representing values of the at least one channel state information quantity for the plurality of conditions based on the channel state information reporting configuration; and
transmitting one or more channel state information reports comprising said determined values, wherein said determined values are configured to allow a further apparatus to determine values of the at least one channel state information quantity.

14. The method of claim 13, wherein said determined values are configured to allow the further apparatus to determine quantized values of the at least one channel state information quantity.

15. The method of claim 13, wherein computing the values for the at least one channel state information quantity for the plurality of conditions comprises computing at least one of a channel quality indicator based on a plurality of rank indicators, a channel quality indicator based on a plurality of interference hypotheses, a channel quality indicator based on a plurality of quasi-co-location assumptions, a reference signal received power based on a plurality of reference signal resource indicators, a reference signal received power based on a plurality of quasi-co-location assumptions, a reference signal strength indicator based on a plurality of reference signal resources, a signal to interference and noise ratio based on a plurality of reference signal resource indicators, or a signal to interference and noise ratio based on a plurality of quasi-co-location assumptions.

16. The method of claim 15, wherein the number of the rank indicators corresponds to at least one of a maximum rank value indicated by the channel state information reporting configuration or a number of antenna elements.

17. The method of claim 15, wherein computing the channel quality indicator comprises computing the channel quality indicator for at least one of a wideband or a plurality of sub-bands.

18. The method of claim 13, wherein said determined values comprise at least one of coefficients characterizing a mathematical equation of the model, coefficients associated to scaling of the channel state information quantity values used to fit the model, reference coefficients or reference indicators.

* * * * *